United States Patent
Huang

(10) Patent No.: US 8,107,742 B2
(45) Date of Patent: Jan. 31, 2012

(54) ENCODER AND DECODER FOR ENCODING AND DECODING PIXEL DATA WITH LOW AMOUNT OF TRANSMITTING DATA, ENCODING METHOD, AND DECODING METHOD THEREOF

(75) Inventor: Ling-Shiou Huang, Tainan County (TW)

(73) Assignee: Himax Technologies Limited, Tainan County (TW)

( * ) Notice: Subject to any disclaimer, the term of this patent is extended or adjusted under 35 U.S.C. 154(b) by 1037 days.

(21) Appl. No.: 12/010,832

(22) Filed: Jan. 30, 2008

(65) Prior Publication Data

US 2009/0190849 A1 Jul. 30, 2009

(51) Int. Cl.
*G06K 9/36* (2006.01)
(52) U.S. Cl. ... 382/232; 382/244; 348/42; 348/E13.001; 375/240.02; 375/E7.126

(58) Field of Classification Search .................. 382/232, 382/244; 348/42, E13.001; 375/240.02, 375/E7.126
See application file for complete search history.

(56) References Cited

U.S. PATENT DOCUMENTS 5,359,438 A * 10/1994 Maeda ........................ 358/539
5,878,168 A * 3/1999 Kondo et al. ................ 382/232

* cited by examiner

*Primary Examiner* — Samir Ahmed
*Assistant Examiner* — Ruiping Li
(74) *Attorney, Agent, or Firm* — Rabin & Berdo, P.C.

(57) ABSTRACT

An encoder encoding an $N^{th}$ pixel data of 2×M pixel data and a decoder decoding an $N^{th}$ encoded pixel data of 2×M encoded pixel data are provided. A first to an $M^{th}$ pixel data are belonged to an $(i-1)^{th}$ data block. An $(M+1)^{th}$ to a $(2\times M)^{th}$ pixel data are belonged to an $i^{th}$ data block. i>1. M<N≦2×M. If the $N^{th}$ pixel data is similar to one of the $(N-1)^{th}$ pixel data, the local minimum or maximum of the $(i-1)^{th}$ data block, the encoder encodes the difference between the $N^{th}$ pixel data and the similar one into the $N^{th}$ encoded pixel data. When decoding the $N^{th}$ encoded pixel data, the decoder adds the $N^{th}$ encoded pixel data to one of a $(N-1)^{th}$ decoded pixel data, local minimum and maximum of a $(i-1)^{th}$ decoded block data.

20 Claims, 5 Drawing Sheets

| Code | Difference value |
|------|------------------|
| 000 | 0 |
| 001 | 1 |
| 100 | −1 |
| 010 | 2 |
| 011 | −2 |
| 101 | 3 |
| 110 | −3 |

500

ENCODER AND DECODER FOR ENCODING AND DECODING PIXEL DATA WITH LOW AMOUNT OF TRANSMITTING DATA, ENCODING METHOD, AND DECODING METHOD THEREOF

BACKGROUND OF THE INVENTION

1. Field of the Invention

The invention relates in general to an encoder, a decoder, an encoding method and a decoding method for encoding and decoding pixel data, and more particularly to an encoder, a decoder, an encoding method and a decoding method for encoding and decoding pixel data with low amount of transmitting data and without data loss.

2. Description of the Related Art

For transmitting a digital image to receiver, the image data is encoded in the transmitter by an encoder. At the receiver a decoder is then used to decode the encoded data to restore the image data. When the encoder uses a lossless algorithm, the restored image is an exact copy of the original image. However, conventional lossless algorithms for encoding image data result in a large amount of data to be transmitted, which, in turn, requires a high bandwidth for the transmission channel. Therefore, it is economically desirable to develop a lossless encoder and decoder algorithm.

SUMMARY OF THE INVENTION

An encoder for sequentially receiving an $(i-1)^{th}$ data block and an $i^{th}$ data block, and encoding an $N^{th}$ pixel data of last M pixel data is provided. Each of the data blocks comprising M pixel data. The $N^{th}$ pixel data is belonged to the $i^{th}$ block data. M, N and i being positive integers. i>1. M<N≦2×M. The encoder includes a first difference generating unit for generating a first difference between the $N^{th}$ pixel data and an $(N-1)^{th}$ pixel data of the 2×M pixel data; a first comparing unit for determining whether the absolute value of the first difference is less than a threshold; a second difference generating unit for generating a first local difference between the $N^{th}$ pixel data and the local maximum pixel data of the $(i-1)^{th}$ data block and a second local difference between the $N^{th}$ pixel data and the local minimum pixel data of the $(i-1)^{th}$ data block, and outputting a second difference which substantially equals to one of the first and the second local differences; a second comparing unit for determining whether the absolute value of the second difference is less than the threshold; an encoding unit for encoding one of the first difference, the second difference and the $N^{th}$ pixel data into an $N^{th}$ encoded pixel data according to the comparing results of the first and second comparing units; and a indicating unit for outputting an indicating signal for indicating whether the $N^{th}$ encoded pixel data corresponds to the $(N-1)^{th}$ pixel data, the local minimum pixel data of the $(i-1)^{th}$ data block, the local maximum pixel data of the $(i-1)^{th}$ data block, or the $N^{th}$ pixel data. The absolute value of the one of the first and the second local differences is less than that of another one of the first and the second local differences.

A decoder sequentially receives 2×M encoded pixel data and decodes an $N^{th}$ encoded pixel data of the last M encoded pixel data according to an indicating signal. The 2×M encoded pixel data are sequentially encoded from 2×M pixel data. A first to an $M^{th}$ pixel data of the 2×M pixel data are belonged to an $(i-1)^{th}$ data block. An $(M+1)^{th}$ to a $(2\times M)^{th}$ pixel data of the 2×M pixel data are belonged to an $i^{th}$ data block. M, N and i are positive integers. i>1. M<N≦2×M. The decoder includes a determining unit for determining whether the $N^{th}$ encoded pixel data corresponds to the $(N-1)^{th}$ pixel data, the local minimum pixel data of the $(i-1)^{th}$ data block, the local maximum pixel data of the $(i-1)^{th}$ data block, or the $N^{th}$ pixel data according to the indicating signal; a decoding unit for decoding the $N^{th}$ encoded pixel data into one of a first decoded difference, a second decoded difference, and an $N^{th}$ decoded pixel data according to the determining result by the determining unit; a first adding unit for adding the first decoded difference to a $(N-1)^{th}$ decoded pixel data to obtain the $N^{th}$ decoded pixel data if the decoding unit outputs the first decoded difference; and a second adding unit. If the decoding unit outputs the second decoded difference, the second adding unit adds the second decoded difference to one of a local maximum decoded pixel data and a local minimum decoded pixel data of a $(i-1)^{th}$ decoded data block according to the indicating signal to obtain the $N^{th}$ decoded pixel data.

An encoding method sequentially receives an $(i-1)^{th}$ data block and an $i^{th}$ data block and encodes an $N^{th}$ pixel data of the last M pixel data. Each of the data blocks includes M pixel data. The $N^{th}$ pixel data is belonged to the $i^{th}$ block data. M, N and i are positive integers. i>1. M<N≦2×M. The encoding method includes the following steps. Firstly, a first difference between the $N^{th}$ pixel data and the $(N-1)^{th}$ pixel data of the 2×M pixel data is generated. Then, whether the first difference is less than a threshold is determined. A second difference which substantially equals to the less one of the difference between the $N^{th}$ pixel data and the local maximum pixel data of the $(i-1)^{th}$ data block and the difference between the $N^{th}$ pixel data and the local minimum pixel data of the $(i-1)^{th}$ data block is generated. Then, whether the second difference is less than the threshold is determined. The, one of the first difference, the second difference, the $N^{th}$ pixel data is encoded into an $N^{th}$ encoded pixel data according to the determining results. Then, an indicating signal for indicating whether the $N^{th}$ encoded pixel data corresponds to the $(N-1)^{th}$ pixel data, the local minimum pixel data of the $(i-1)^{th}$ data block, the local maximum pixel data of the $(i-1)^{th}$ data block, or the $N^{th}$ pixel data is outputted.

A decoding method receives 2×M encoded pixel data and decodes an $N^{th}$ encoded pixel data of the last M encoded pixel data according to an indicating signal. The 2×M encoded pixel data are sequentially encoded from 2×M pixel data. A first to an $M^{th}$ pixel data of the 2×M pixel data are belonged to an $(i-1)^{th}$ data block. An $(M+1)^{th}$ to a $(2\times M)^{th}$ pixel data of the 2×M pixel data are belonged to an $i^{th}$ data block. M, N and i are positive integers. i>1. M<N≦2×M. The decoding method includes the following steps. Firstly, whether the $N^{th}$ encoded current pixel data corresponds to the $(N-1)^{th}$ pixel data, the local minimum pixel data of the $(i-1)^{th}$ data block, the local maximum pixel data of the $(i-1)^{th}$ data block, or the $N^{th}$ pixel data according to the indicating signal is determined. Then, the $N^{th}$ encoded pixel data is decoded into one of a first decoded difference, a second decoded difference, and an $N^{th}$ decoded pixel data according to the determining result. Next, if the first decoded difference is outputted, the first decoded difference is added to the $(N-1)^{th}$ decoded pixel data to obtain the $N^{th}$ decoded pixel data. If the second decoded difference is outputted, the second decoded difference is added to one of a local maximum decoded pixel data and a local minimum decoded pixel data of a $(i-1)^{th}$ decoded data block according to the indicating signal to obtain the $N^{th}$ decoded pixel data.

DETAILED DESCRIPTION OF THE INVENTION

Figure 1:
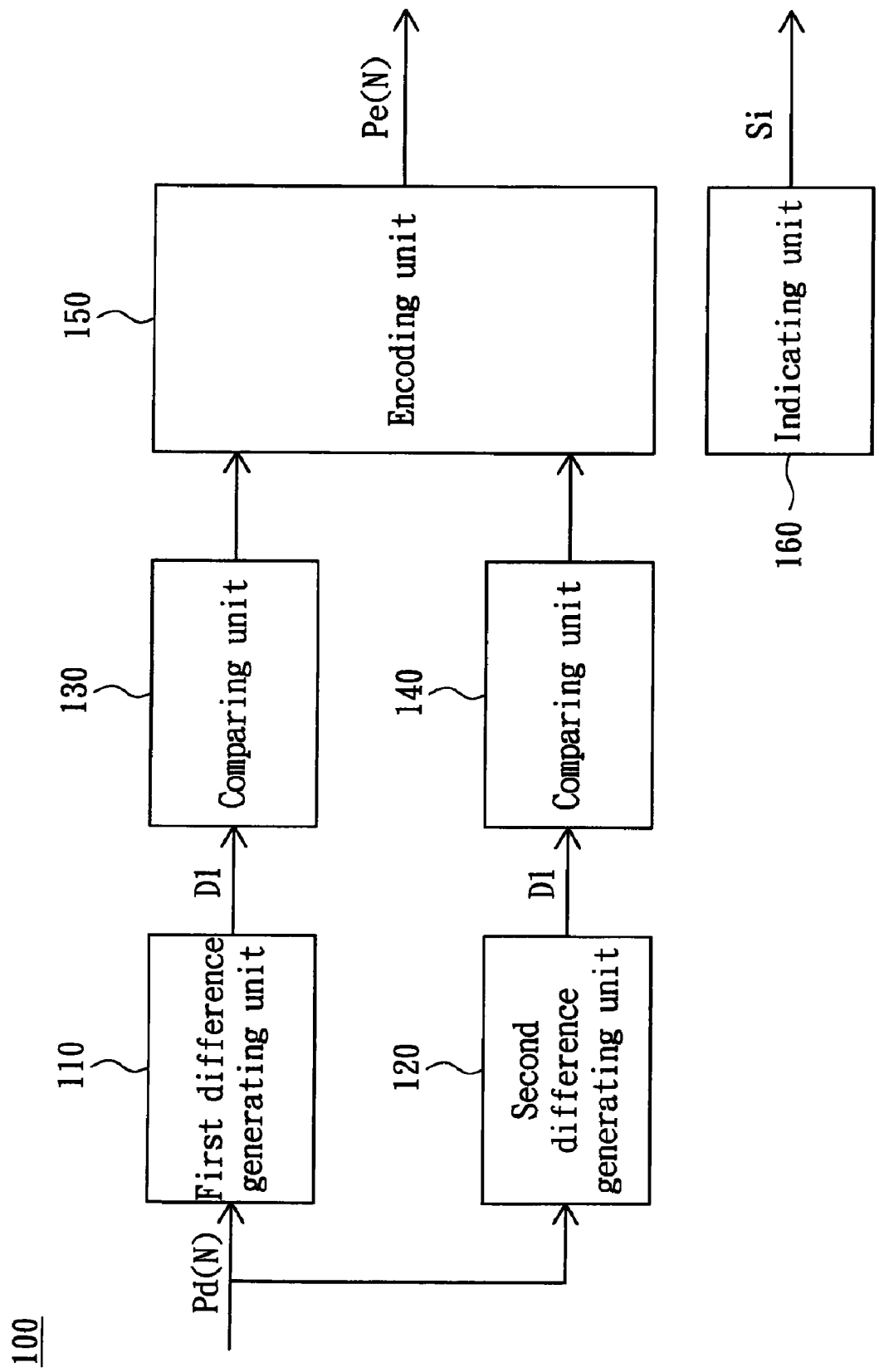
FIG. 1 shows a block diagram of the encoder for sequentially receiving 2×M pixel data Pd and encoding a $N^{th}$ pixel data Pd(N) according to the embodiment.

"An encoder according to the embodiment sequentially receives an $(i-1)^{th}$ data block and an $i^{th}$ data block, and encodes an $N^{th}$ pixel data of the last M pixel data. Each of the data blocks comprising M pixel data. The $N^{th}$ pixel data is belonged to the $i^{th}$ block data. M, N and i are positive integers. i >1. M<N<2×M. The encoder includes a first difference generating unit, a first comparing unit, a second difference generating unit, a second comparing unit, and an encoding unit, wherein the function of at least one of the above units is performed by a processor."

The first difference generating unit generates a first difference between the $N^{th}$ pixel data and an $(N-1)^{th}$ pixel data of the 2×M pixel data. The first comparing unit determines whether the absolute value of the first difference is less than a threshold.

The second difference generating unit generates a first local difference between the $N^{th}$ pixel data and the local maximum pixel data of the $(i-1)^{th}$ data block and a second local difference between the $N^{th}$ pixel data and the local minimum pixel data of the $(i-1)^{th}$ data block, and outputs a second difference which substantially equals to one of the first and the second local differences. The absolute value of the one of the first and the second local differences is less than that of another one of the first and the second local differences.

The second comparing unit determines whether the absolute value of the second difference is less than the threshold. The encoding unit encodes one of the first difference, the second difference and the $N^{th}$ pixel data into an $N^{th}$ encoded pixel data according to the comparing results of the first and second comparing units. The indicating unit outputs an indicating signal for indicating whether the $N^{th}$ encoded pixel data corresponds to the $(N-1)^{th}$ pixel data, the local minimum pixel data of the $(i-1)^{th}$ data block, the local maximum pixel data of the $(i-1)^{th}$ data block, or the $N^{th}$ pixel data.

A decoder sequentially receives 2×M encoded pixel data and decodes an $N^{th}$ encoded pixel data of the last M encoded pixel data according to an indicating signal. The 2×M encoded pixel data are sequentially encoded from the 2×M pixel data. A first to an $M^{th}$ pixel data of the 2×M pixel data are belonged to an $(i-1)^{th}$ data block. An $(M+1)^{th}$ to a $(2 \times M)^{th}$ pixel data of the 2×M pixel data are belonged to an $i^{th}$ data block. M, N and i are positive integers. i>1. M<N<2×M. The decoder includes a determining unit, a decoding unit, a first adding unit and a second adding unit, wherein the function of at least one of the above units is performed by a processor.

The determining unit determines whether the $N^{th}$ encoded pixel data corresponds to the $(N-1)^{th}$ pixel data, the local minimum pixel data of the $(i-1)^{th}$ data block, the local maximum pixel data of the $(i-1)^{th}$ data block, or the $N^{th}$ pixel data according to the indicating signal. The decoding unit decodes the $N^{th}$ encoded pixel data into one of a first decoded difference, a second decoded difference, and an $N^{th}$ decoded pixel data according to the determining result by the determining unit.

The first adding unit adds the first decoded difference to a $(N-1)^{th}$ decoded pixel data to obtain the $N^{th}$ decoded pixel data if the decoding unit outputs the first decoded difference. If the decoding unit outputs the second decoded difference, the second adding unit adding the second decoded difference to one of a local maximum decoded pixel data and a local minimum decoded pixel data of a $(i-1)^{th}$ decoded data block according to the indicating signal to obtain the $N^{th}$ decoded pixel data.

FIG. 1 shows a block diagram of the encoder for sequentially receiving 2×M pixel data Pd and encoding a $N^{th}$ pixel data Pd(N) according to the embodiment. The 2×M pixel data Pd are divided into data blocks, an $(i-1)^{th}$ data block Db(i-1) and an $i^{th}$ data block Db(i). The $(i-1)^{th}$ data block Db(i-1) includes the first to the $M^{th}$ pixel data Pd(1) to Pd(M) of the 2×M pixel data Pd. The $i^{th}$ data block Db(i) includes the $(M+1)^{th}$ to the $(2 \times M)^{th}$ pixel data Pd(M+1) to Pd(2×M). The $N^{th}$ pixel data Pd(N) belongs to the $i^{th}$ data block Db(i). M, N and i are positive integers. i>1. M<N≦2×M.

Referring to FIG. 1, the encoder 100 according to the embodiment includes a first difference generating unit 110 and a second difference generating unit 120, two comparing units 130 and 140, an encoding unit 150, and an indicating unit 160.

Figure 2:
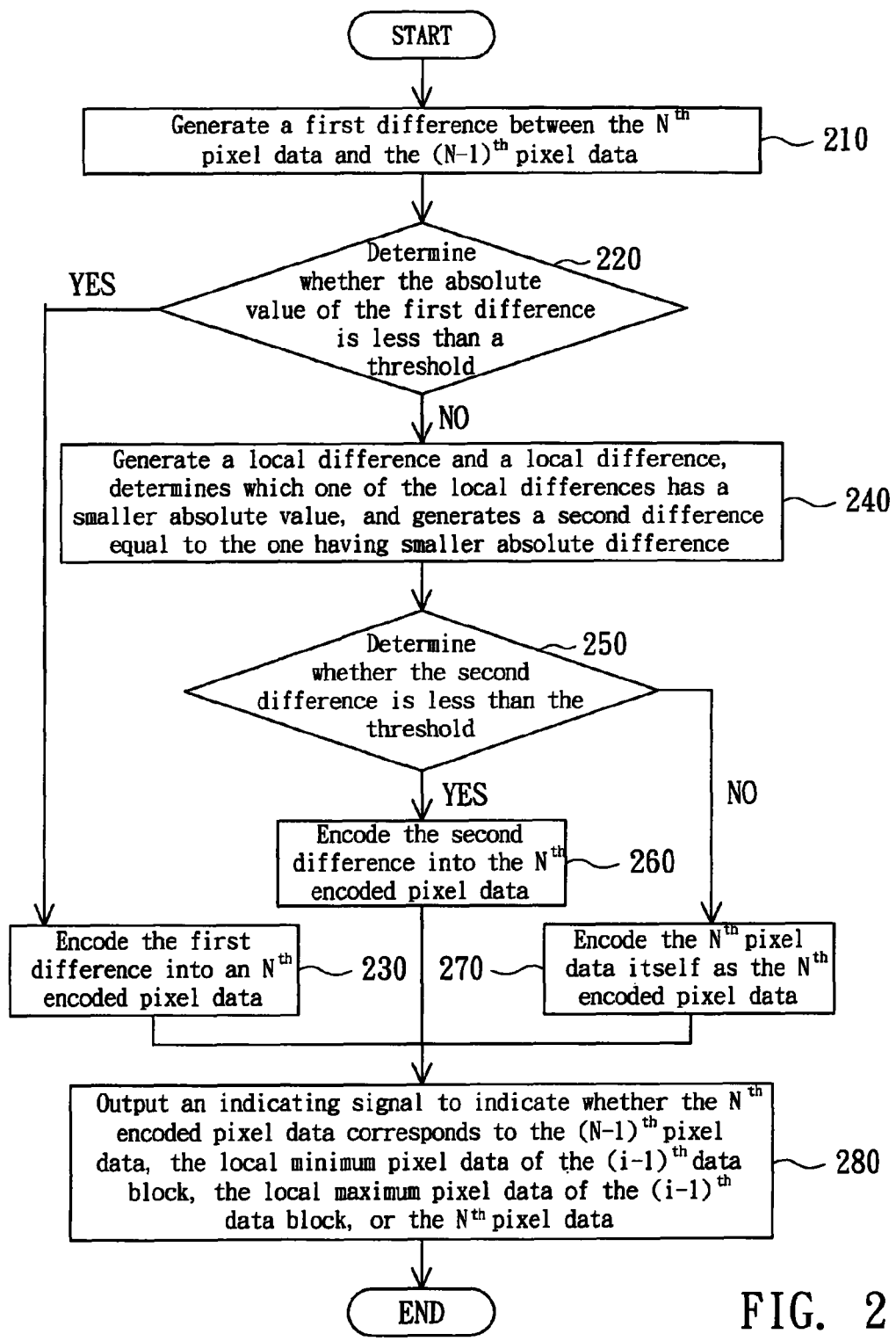
FIG. 2 shows a flowchart of the encoding method which is performed by the encoder for encoding the $N^{th}$ pixel data.

FIG. 2 shows a flowchart of the encoding method which is performed by the encoder 100 for encoding the $N^{th}$ pixel data Pd(N). First, in step 210, the first difference generating unit 110 generates a first difference D1 between the $N^{th}$ pixel data Pd(N) and the previous pixel data, the $(N-1)^{th}$ pixel data Pd(N-1). The first difference D1 is equal to Pd(N)-Pd(N-1). Then in step 220, the comparing unit 130 determines whether the absolute value of the first difference D1 is less than a threshold.

In step 220, when the first difference D1 is less than the threshold, the encoding method proceeds to step 230. In step 230, the encoding unit 150 encodes the first difference D1 into an $N^{th}$ encoded pixel data Pe(N).

In step 220, when the first difference D1 is not less than the threshold, the encoding method proceeds to step 240. In step 240, the second difference generating unit 120 generates a local difference Dmax and a local difference Dmin. The local difference Dmax is the difference between the $N^{th}$ pixel data Pd(N) and the local maximum pixel data Pmax(i-1) of the $(i-1)^{th}$ data block Db(i-1), which is equal to Pd(N)-Pmax(i-1). The local difference Dmin is the difference between the $N^{th}$ pixel data Pd(N) and the local minimum pixel data Pmin(i-1) of the $(i-1)^{th}$ data block Db(i-1), which is equal to Pd(N)-Pmin(i-1). In step 240, the second difference generating unit 120 then determines which one of the local differences Dmin and Dmax has a smaller absolute value and generates a second difference D2 substantially equal to the one having smaller absolute difference.

Then in step 250, the comparing unit 140 determines whether the second difference D2 is less than the threshold. In step 250, when the second difference D2 is less than the threshold, the method proceeds to step 260. In step 260, the encoding unit 150 encodes the second difference D2 into the $N^{th}$ encoded pixel data Pe(N). That is, when the first difference D1 is not less than the threshold, and the second difference D2 is less than the threshold, the second difference D2 is encoded.

In step 250, when the second difference D2 are not less than the threshold, the method proceeds to step 270. In step 270, the encoding unit 150 encodes the $N^{th}$ pixel data Pd(N) itself as the $N^{th}$ encoded pixel data Pe(N). That is, when the first and the second differences D1 and D2 are not less than the threshold, the $N^{th}$ pixel data itself is encoded.

Then in step 280, the indicating unit 160 outputs an indicating signal Si to indicate whether the $N^{th}$ encoded pixel data Pe(N) corresponds to the $(N-1)^{th}$ pixel data Pd(N−1), the local minimum pixel data Pmin(i−1) of the $(i-1)^{th}$ data block Db(i−1), the local maximum pixel data Pmax(i−1) of the $(i-1)^{th}$ data block Db(i−1), or the $N^{th}$ pixel data Pd(N).

Thus, the encoder 100 performs the encoding method on the $N^{th}$ pixel data Pd(N) and generates the encoded pixel data Pe(N) and the indicating signal Si.

Figure 3:
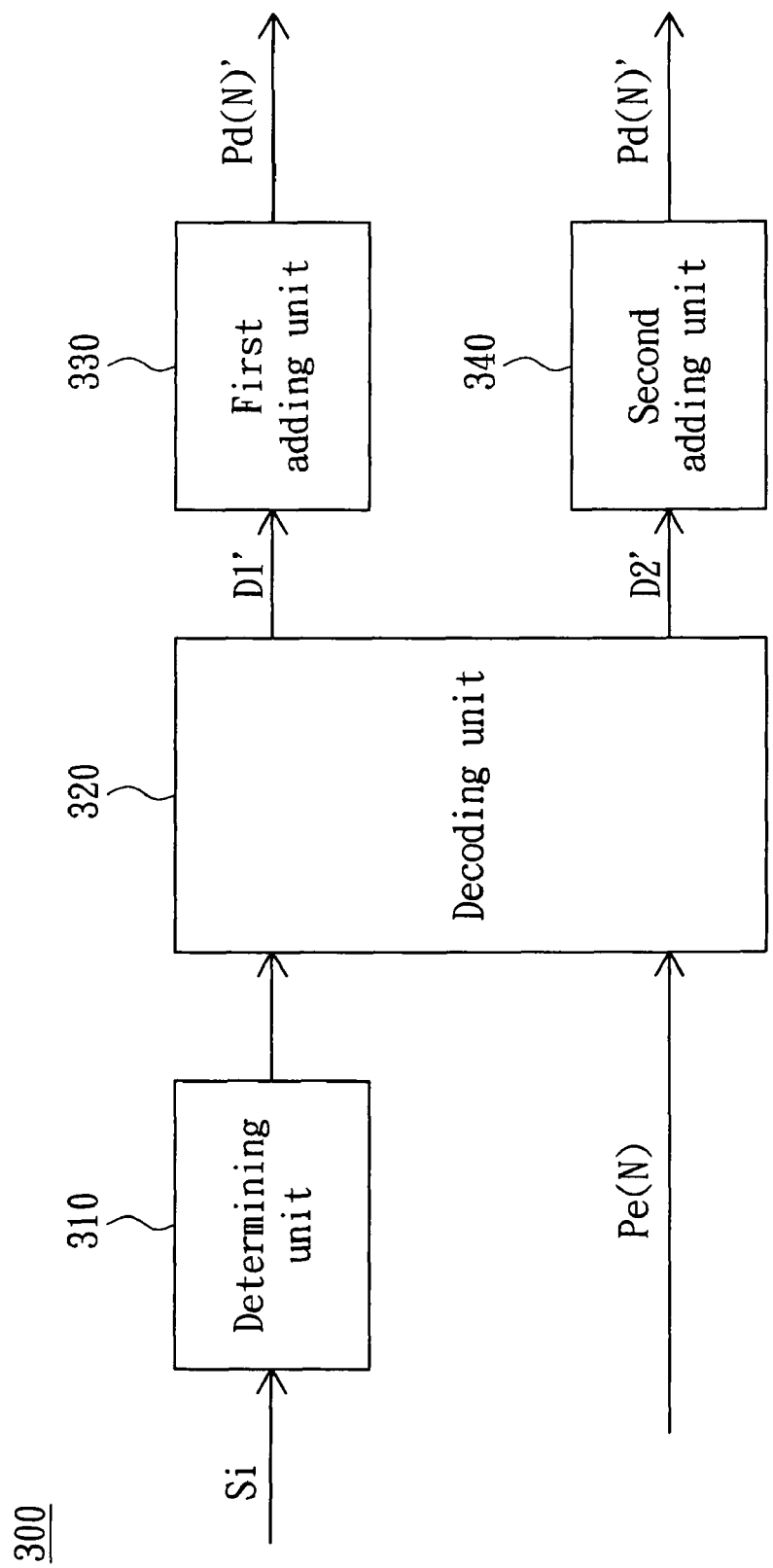
FIG. 3 shows the block diagram of the decoder 300 according to the embodiment.

FIG. 3 shows the block diagram of the decoder 300 according to the embodiment. The decoder 300 sequentially receives N encoded pixel data Pe, and decodes the $N^{th}$ encoded pixel data Pe(N) according to the indicating signal Si. Referring to FIG. 3, the decoder 300 includes a determining unit 310, a decoding unit 320, a first adding unit 330 and a second adding unit 340.

Figure 4:
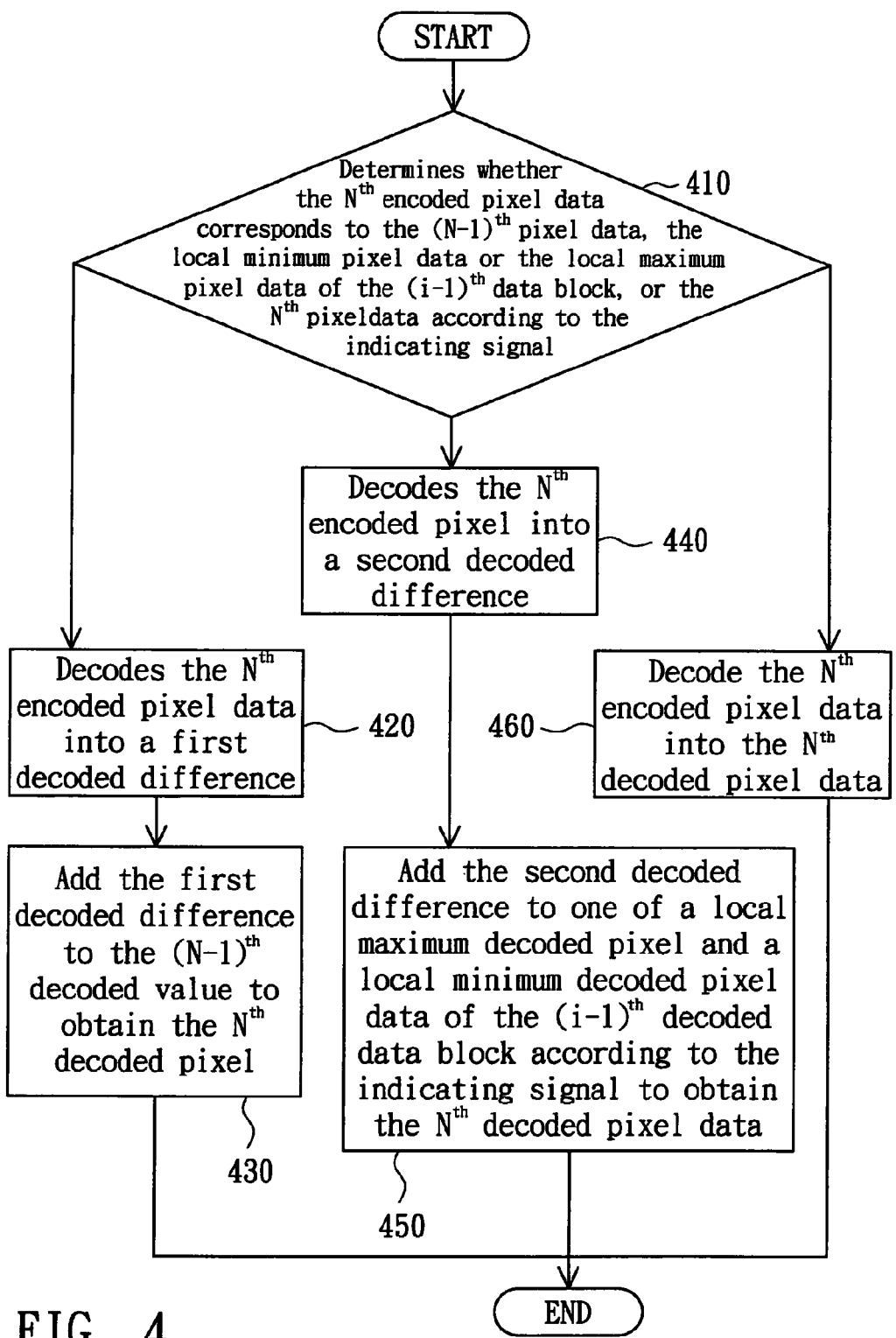
FIG. 4 shows a flowchart of a decoding method which is performed by the decoder for decoding the $N^{th}$ encoded pixel data.

FIG. 4 shows a flowchart of a decoding method which is performed by the decoder 300 for decoding the $N^{th}$ encoded pixel data Pe(N). First, in step 410, the determining unit 310 determines whether the $N^{th}$ encoded pixel data Pe(N) corresponds to the $(N-1)^{th}$ pixel data Pd(N−1), the local minimum pixel data Pmin(i−1) or the local maximum pixel data Pmax(i−1) of the $(i-1)^{th}$ data block Db(i−1), or the $N^{th}$ pixel data Pd(N) according to the indicating signal Si.

When the $N^{th}$ encoded pixel data Pe(N) corresponds to the $(N-1)^{th}$ pixel data Pd(N−1), the encoding method proceeds to step 420. In step 420, the decoding unit 320 decodes the $N^{th}$ encoded pixel data Pe(N) into a first decoded difference D1'. Then in step 430, the first adding unit 330 adds the first decoded difference D1' to the $(N-1)^{th}$ decoded value Pd(N−1)' to obtain the $N^{th}$ decoded pixel Pd(N)'.

In step 410, when the $N^{th}$ encoded value Pe(N) corresponds to the local minimum pixel Pmin(i−1) or the local maximum pixel Pmax(i−1), the decoding method proceeds to step 440. In step 440, the decoder 300 decodes the $N^{th}$ encoded pixel Pe(N) into a second decoded difference D2'.

Then in step 450, the second adder 340 adds the second decoded difference D2' to one of a local maximum decoded pixel Pmax(i−1)' and a local minimum decoded pixel data Pmin(i−1)' of the $(i-1)^{th}$ decoded data block Db(i−1)' according to the indicating signal Si to obtain the $N^{th}$ decoded pixel data Pd(N)'.

In step 410, when the $N^{th}$ encoded pixel data Pe(N) corresponds to the $N^{th}$ pixel data Pd(N), the decoding method proceeds to step 460. In step 460, the decoder 300 decodes the $N^{th}$ encoded pixel data Pe(N) into the $N^{th}$ decoded pixel data Pd(N)'.

Thus, the decoder 300 performs the decoding method on the encoded pixel data Pe(N) and generates the decoded pixel data Pd(N)'.

Figures 5, 6:
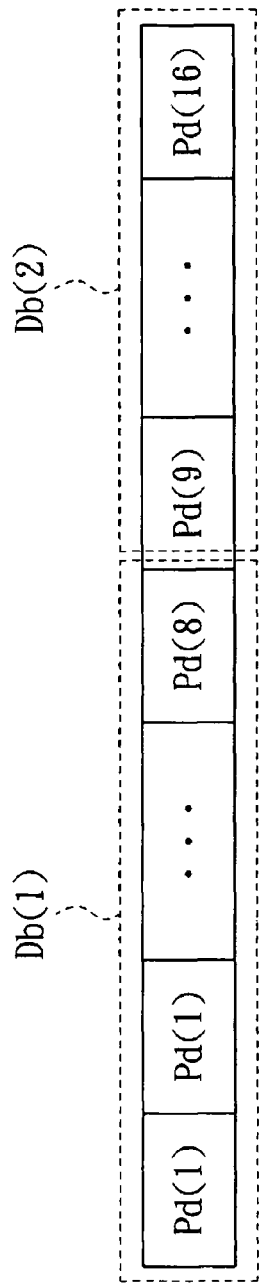
FIG. 5 shows an example of a code table used by the encoding unit in the encoder and the decoding unit in the decoder.
FIG. 6 shows an example of a diagram of part of an image data which includes a number of the pixel data.

The encoding method performed by the encoder 100 and the decoding method performed by the decoder 300 is explained in detail as follows. In the embodiment, the encoding unit 150 encodes the first and second differences D1 and D2 by a fixed bit coding method, and the threshold is set to, for example, 4. Thus, the first and the second differences D1 and D2 range from −3 to 3, and each difference value corresponds to a 3-bit code. FIG. 5 shows an example of a code table used by the encoder 150 and the decoder 320. The code table 500 records the relationship between each of the difference values and the corresponding 3-bit code. For example, the difference value 1 corresponds to the code 001, and the difference value −3 corresponds to the code 110.

In the following three examples of the decoding process, the encoder 100 is exemplified to encode a ninth pixel data Pd(9) of the 16 pixel data Pd(1) to Pd(16), and the decoder 300 is exemplified to decode the ninth pixel data Pd(9). The number N and M, respectively, are taken to be equal to 9 and 8. FIG. 6 shows an example of a diagram of part of an image data which includes a number of the pixel data Pd. In FIG. 6, the data block Db(1) includes the first pixel data Pd(1) to the eighth pixel data Pd(8), while the data block Db(2) includes the ninth pixel data Pd(9) to the sixteenth pixel data Pd(16). The number i is taken to be equal to 2.

In the embodiment, the encoder 100 sequentially encodes the pixel data Pd. Therefore, before encoding the pixel data Pd(9), the encoder has encoded the pixel data Pd(1) to Pd(8) and generated the encoded pixel data Pe(1) to Pe(8). Similarly, in the embodiment, the decoder 300 also sequentially receives and decodes the encoded pixel data Pe. Thus, before decoding the encoded pixel data Pe(9), the decoder 300 has already decoded the encoded pixel data Pe(1) to Pe(8) and obtained the decoded pixel data Pd(1)' to Pd(8)'. In the embodiment, the decoded pixel data Pd(1)' to Pd(8)' belong to a decoded data block Db(1)'.

Example 1

In example 1, the pixel data Pd(9) and its previous pixel data Pd(8) are assumed to be equal to grey level values 127 and 129, respectively, which are in the range 0 to 255. To encode the pixel Pd(9), the first difference generating unit 110 in the encoder 100 generates the first difference D1 between the pixel data Pd(9) and Pd(8), which here equals −2 (127−129). The comparing unit 130 then decides whether the absolute value of the first difference D1 is less than the threshold, which is set to 4. Thus, the encoding unit 150 encodes the first difference D1 into the encoded pixel data Pe(8) according to the code table 500.

Refer to FIG. 5, the difference −2 corresponds to a code 011. Therefore, the encoding unit 150 encodes the first difference D1 into the encoded pixel data Pe(8), which is the code 011. The indicating unit 160 then outputs the indicating signal Si which indicates that the encoded pixel data Pe(8) corresponds to the pixel data Pd(7). Thus, the encoder 100 performs the encoding method on the pixel data Pd(9) and generates the encoded pixel data Pe(9) and the indicating signal Si.

When the decoder 300 receives the indicating signal Si and the encoded pixel data Pe(9), the determining unit 310 in the decoder 300 first decides whether the encoded pixel data Pe(9) corresponds to the pixel data Pd(8). The decoding unit 320 then decodes the encoded pixel data Pe(9) into a first decoded difference D1' according to the code table 500. Since the encoded pixel data Pe(9) is the code 011, which corresponds to the difference value −2 in the code table 500, the decoding unit 320 generates the first decoded difference D1' which is equal to −2.

The adding unit 330 receives the first decoded difference D' and adds it to a decoded pixel data Pd(8)'. In the embodiment, the decoded pixel data Pd(8)' is equal to the pixel data Pd(8). That is, the decoded pixel data Pd(8)' is equal to 129. Thus, the adding unit 330 adds the first decoded difference D1', −2, to the decoded pixel data Pd(8)', 129, and obtains the decoded pixel data Pd(9)'. As a result, the decoded pixel data Pd(9)' is equal to 127 (129+(−2)).

Therefore, when the encoded pixel data Pd(9) corresponds to the pixel data Pd(8), the decoded pixel data Pd(9)', encoded from the encoded pixel data Pe(9), is equal to the original pixel data Pd(9). The decoded pixel data Pd(9)' can be used to decode the next encoded pixel data Pe(10), encoded from a pixel data Pd(10), if the next encoded pixel data Pe(10) corresponds to a previous pixel data Pd(9). In this way, the next decoded pixel Pd(10)' is also equal to the original pixel data Pd(10).

Example 2

In example 2, the pixel data Pd(9) and its previous pixel data Pd(8), the local maximum pixel data Pmax(1) and the local minimum pixel data Pmin(1) of the data block Db(1) is assumed to be equal to grey values 127, 120, 140 and 126, respectively. To encode the pixel data Pd(9), the first difference generating unit 110 in the encoder 100 generates the first difference D1 between the pixel data Pd(9) and Pd(8), being equal to 7 (127-120). The comparing unit 130 then decides whether the absolute value of the first difference D1, is not less than the threshold. Thus, the encoding unit 150 does not encode the first difference D1.

Meanwhile, the second difference generating unit 120 in the encoder 100 generates the local difference Dmax equal to −13 (127-140) and the local difference Dmin equal to 1 (127-126). Since the absolute value of the local difference Dmin is less than the local difference Dmax, the second difference generating unit 120 thus generates the second difference D2 equal to the local difference Dmin. That is, the second difference D2 generated by the second difference generating unit 120 is equal to 1.

The comparing unit 140 then decides whether the absolute value of the second difference D2 is less than the threshold. Thus, the encoding unit 150 encodes the second difference D2 into the encoded pixel data Pe(9). Since the difference D2, equal to 1, corresponds to the code 001 in FIG. 5, the encoded pixel data Pe(9) generated by the encoding unit 150 is 001. In addition, since the second difference D2 is the difference between the encoded pixel data Pe(9) and the local minimum pixel data Pmin(1), the indicating unit 160 generates the indicating signal Si indicating the encoded pixel data Pe(9) corresponds to the local minimum pixel data Pmin(1).

When the decoder 300 receives the indicating signal Si and the encoded pixel data Pe(9), the determining unit 310 in the decoder 300 first decides whether the encoded pixel data Pe(9) corresponds to the local minimum pixel data Pmin(1) according to the indicating signal Si. The decoding unit 320 then decodes the encoded pixel data Pe(9) into a second decoded difference D2' according to the code table 500. Since the encoded pixel data Pe(9) is the code 001, which corresponds to the difference value 1 in the code table 500, the decoding unit 320 generates the second decoded difference D2' which is equal to 1.

Since the indicating signal Si indicating the encoded pixel data Pe(9) corresponds to the local minimum pixel data Pmin(1), the adding unit 340 receives the second decoded difference D2' and adds it to a local minimum decoded pixel data Pmin(1)' of a decoded block data Db(1)'.

In this example, the decoded block data Db(1)' includes decoded pixel data Pd(1)' to Pd(8)', which are equal to the pixel data Pd(1) to Pd(8), respectively. Thus, the local minimum decoded pixel data Pmin(1)' of the decoded block data Db(1)' is equal to the local minimum pixel data Pmin(1) of the data block Db(1). That is, the local minimum decoded pixel data Pmin(1) is equal to 126. Thus, the adding unit 340 adds the second decoded difference D2', equal to 1, to the local minimum decoded pixel data Pmin(1)' to get 126, so obtains the decoded pixel data Pd(9)'. As a result, the decoded pixel data Pd(9)' is equal to 127 (126+1).

Therefore, when the encoded pixel data Pe(9) corresponds to the local minimum pixel data or the local maximum pixel data, the decoded pixel data Pd(9)', decoded from the encoded pixel data Pe(9), is equal to the original pixel data Pd(9). The local minimum decoded pixel data Pmin(1)' or the local maximum decoded pixel data Pmax(1)' of the decoded data block Db(1)' can be used to decode the next encoded pixel data Pe(10), encoded from a pixel data Pd(10) in the data block Db(2), if the encoded pixel data Pe(10) corresponds to the local minimum pixel data Pmin(1) or the local maximum pixel data Pmax(1). In this way, the next decoded pixel Pd(10)' is equal to the original pixel data Pd(10).

Example 3

In example 3, the pixel data Pd(9), its previous pixel data Pd(8), the local minimum pixel data Pmin and the local maximum pixel data Pmax of the data block Db(1) are assumed to be equal to grey levels 127, 140, 120, and 152, respectively. To encode the pixel data Pd(9), the first difference generating unit 110 in the encoder 100 generates the first difference D1 between the pixel data Pd(9) and Pd(B), which is −13 (127-140). The comparing unit 130 then decides whether the absolute value of the first difference D1, −13, is not less than the threshold, which is set to 4. Thus, the encoding unit 150 does not encode the first difference D1.

Similarly, the second difference generating unit 140 in the encoder 100 generates the local difference Dmax, 7 (127-120), and the local difference Dmin, −15(127-152). The second difference generating unit 140 then generates the second difference D2 equal to the local difference Dmax. The comparing unit 140 then decides that the absolute value of the second difference D2 is also not less than the threshold. Thus the encoding unit 150 does not encode the second difference D2.

When the encoding unit 150 encodes neither the first difference D1 nor the second difference D2, the encoding unit 150 encodes the pixel data Pd(9) directly into the encoded pixel data Pe(9). In addition, the indicating unit 160 generates the indicating signal Si indicating the encoded pixel data Pe(9) corresponds to the pixel data Pd(9) itself.

When the decoder 300 receives the encoded pixel data Pe(9) and the indicating signal Si, the determining unit in the decoder 300 decides that the encoded pixel data Pe(9) corresponds to the pixel data Pd(9) itself. Thus, the decoding unit 140 directly decodes the encoded pixel data Pe(9) into the decoded pixel data Pd(9)'.

The effect of the encoder 100 is discussed as follows. In the embodiment, each pixel data Pd has a grey level between 0 and 255. Thus, if the pixel data is directly encoded, an 8-bit code is required to represent the pixel data. In example 1, the absolute value of the first difference D1 is less than the threshold, so the pixel data Pd(9) is similar to its previous pixel data Pd(8). By encoding the small first difference D1, the encoded pixel data Pe(9) is only 3 bits, which is smaller than the number of bits required to encode the original pixel data Pd(9) directly. Therefore, the encoder 100 can reduce the amount of data needed to be transmitted to the decoder 300.

Similarly, in the example 2, the absolute value of the second difference D2 is less than the threshold. So, the pixel data Pd(9) is similar to the local maximum pixel data or the minimum pixel data of the data block Db(1). By encoding the small second difference D2, the encoded pixel data Pe(9) is only 3 bits, which is smaller than the number of bits required if the original pixel data Pd(9) is encoded directly.

In addition, by adding the encoded pixel data Pe(9) to the decoded pixel which has already been obtained, the decoded pixel data Pd(9)' generated by the decoder 400 is equal to the original pixel data Pd(9).

In the three examples, the encoder 100 encodes the ninth pixel data Pd(9) into the ninth encoded pixel data Pe(9), while the decoder 300 decodes the ninth pixel data Pe(9) into the ninth decoded pixel data Pd(9)'. All other pixels work similarly.

Therefore, when the pixel data Pd(N) is similar to the pixel data Pd(N−1) or the local maximum pixel data Pmax(i−1) or the local minimum pixel Pmin(i−1), the encoder 100 can obtain the encoded pixel data Pe(N), which is shorter than the original pixel data Pd(N). Thus, when the encoder 100 is used in a transmitter, the amount of data is reduced by transmitting only the difference. In this way, the bandwidth required of the transmission channel is reduced.

Moreover, even the number of bits needed for the encoded pixel data Pe(N) is reduced to only 3 bits, and the decoder 400 can still obtain the decoded pixel data Pd(N)' precisely equal to the original pixel data Pd(N). Before the decoder 300 decodes the encoded pixel data Pe(N), the decoder 300 has obtained the decoded pixel data Pd(1)' to Pd(N−1)', equal to the original pixel data Pd(1) to Pd(N−1), respectively. By adding the decoded difference decoded from the encoded pixel data Pe(N) to one of the previously decoded pixel data Pd(1)' to Pd(N−1)', the obtained decoded pixel data Pd(N)' is equal to the original pixel data Pd(N).

In addition, the encoder 100 does not have to transfer the local minimum pixel Pmin(i−1) or the local maximum pixel Pmax(i−1) to the decoder 400, since Pmin(i−1)' and Pmax(i−1)' have been obtained by the decoder 300 before decoding the encoded pixel data Pe(N). Hence, the encoder 100 can further reduce the bandwidth needed for the transmitting channel.

In the embodiment, the block data Db is exemplified to include eight pixels. However, it is not limited thereto. The block data can include more than one pixel in practice.

In the embodiment, the threshold is exemplified to be 4, and the code table is exemplified to be the one in FIG. 5. However, it is not limited thereto. For example, the threshold can be set to be 3. Thus, each difference value whose absolute value is smaller than 3 corresponds to a unique code.

In the embodiment, the pixel data Pd can be the pixel data of luminance (Y) or chrominance (U or V). The 2×M pixel data Pd can also be the pixel data of red (R), green (G) or blue (B).

In the embodiment, the encoder 100 and the decoder 400 encodes and decodes by the fixed bit coding method, respectively. However, it is not limited thereto. The encoder 100 and the decoder 400 can encode and decode by a Huffman coding method.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An encoder for sequentially receiving an $(i-1)^{th}$ data block and an $i^{th}$ data block, each of the data blocks comprising M pixel data, and encoding an $N^{th}$ pixel data of the last M pixel data, the $N^{th}$ pixel data being belonged to the $i^{th}$ block data, M, N and i being positive integers, i>1, M<N≦2×M, the encoder comprising:

a first difference generating unit for generating a first difference between the $N^{th}$ pixel data and an $(N-1)^{th}$ pixel data of the 2×M pixel data;

a first comparing unit for determining whether the absolute value of the first difference is less than a threshold;

a second difference generating unit for generating a first local difference between the $N^{th}$ pixel data and the local maximum pixel data of the $(i-1)^{th}$ data block and a second local difference between the $N^{th}$ pixel data and the local minimum pixel data of the $(i-1)^{th}$ data block, and outputting a second difference which substantially equals to one of the first and the second local differences, the absolute value of the one of the first and the second local differences being less than that of another one of the first and the second local differences;

a second comparing unit for determining whether the absolute value of the second difference is less than the threshold;

an encoding unit for encoding one of the first difference, the second difference and the $N^{th}$ pixel data into an $N^{th}$ encoded pixel data according to the comparing results of the first and second comparing units; and a indicating unit, for outputting an indicating signal for indicating whether the $N^{th}$ encoded pixel data corresponds to the $(N-1)^{th}$ pixel data, the local minimum pixel data of the $(i-1)^{th}$ data block, the local maximum pixel data of the $(i-1)^{th}$ data block, or the $N^{th}$ pixel data;

wherein the function of at least one of the above units is performed by a processor.

2. The encoder according to claim 1, wherein the encoding unit encodes the first difference into the $N^{th}$ encoded pixel data when the absolute value of the first difference is less than the threshold, encodes the second difference into the $N^{th}$ encoded pixel data when the absolute value of the second difference is less than the threshold and when the absolute value of the first difference is not less than the threshold, and encodes the $N^{th}$ pixel data as the $N^{th}$ encoded pixel data when the absolute values of the first and the second differences are not less than the threshold.

3. The encoder according to claim 1, wherein the 2×M pixel data are the pixel data of luminance (Y) or chrominance (U or V).

4. The encoder according to claim 1, wherein the 2×M pixel data are the pixel data of red (R), green (G) or blue (B).

5. The encoder according to claim 1, wherein the encoding unit is further for encoding the first and the second differences by a fixed bit coding method or a Huffman coding method.

6. A decoder for sequentially receiving 2×M encoded pixel data and decoding an $N^{th}$ encoded pixel data of the last M encoded pixel data according to an indicating signal, the 2×M encoded pixel data being sequentially encoded from 2×M pixel data, a first to an $M^{th}$ pixel data of the 2×M pixel data being belonged to an $(i-1)^{th}$ data block, an $(M+1)^{th}$ to a $(2×M)^{th}$ pixel data of the 2×M pixel data being belonged to an $i^{th}$ data block, M, N and i being positive integers, i>1, M<N≦2×M, the decoder comprising:

a determining unit for determining whether the $N^{th}$ encoded pixel data corresponds to the $(N-1)^{th}$ pixel data, the local minimum pixel data of the $(i-1)^{th}$ data block, the local maximum pixel data of the $(i-1)^{th}$ data block, or the $N^{th}$ pixel data according to the indicating signal;

a decoding unit for decoding the $N^{th}$ encoded pixel data into one of a first decoded difference, a second decoded difference, and an $N^{th}$ decoded pixel data according to the determining result by the determining unit;

a first adding unit for adding the first decoded difference to a $(N-1)^{th}$ decoded pixel data to obtain the $N^{th}$ decoded pixel data if the decoding unit outputs the first decoded difference; and a second adding unit, if the decoding unit outputs the second decoded difference, the second adding unit adding the second decoded difference to one of a local maximum decoded pixel data and a local minimum decoded pixel data of a $(i-1)^{th}$ decoded data block according to the indicating signal to obtain the $N^{th}$ decoded pixel data;

wherein the function of at least one of the above units is performed by a processor.

7. The decoder according to claim 6, wherein when the determining unit determines the $N^{th}$ encoded pixel data corresponds to the $(N-1)^{th}$ pixel data, the decoding unit decodes the $N^{th}$ encoded pixel data into the first decoded difference; when the determining unit determines the $N^{th}$ encoded pixel data corresponds to the local minimum pixel data of the $(i-1)^{th}$ data block or the local maximum pixel data of the $(i-1)^{th}$ data block, the decoding unit decodes the $N^{th}$ encoded pixel data into the second decoded difference;

when the $N^{th}$ encoded pixel data corresponds to the $N^{th}$ pixel data, the decoding unit decodes the $N^{th}$ encoded pixel data into the $N^{th}$ decoded pixel data.

8. The decoder according to claim 6, wherein the 2×M pixel data are the pixel data of luminance (Y) or chrominance (U or V).

9. The decoder according to claim 6, wherein the 2×M pixel data are the pixel data of red (R), green (G) or blue (B).

10. The decoder according to claim 6, wherein the decoding unit is further for decoding the Nth pixel data by a fixed bit coding method or a Huffman coding method.

11. An encoding method for sequentially receiving an $(i-1)^{th}$ data block and an $i^{th}$ data block, each of the data blocks comprising M pixel data, and encoding an $N^{th}$ pixel data of the last M pixel data, the $N^{th}$ pixel data being belonged to the $i^{th}$ block data, M, N and i being positive integers, i>1, M<N≦2×M, the encoding method comprising:

generating a first difference between the $N^{th}$ pixel data and the $(N-1)^{th}$ pixel data of the 2×M pixel data;

determining whether the first difference is less than a threshold;

generating a second difference which substantially equals to the less one of the difference between the $N^{th}$ pixel data and the local maximum pixel data of the $(i-1)^{th}$ data block and the difference between the $N^{th}$ pixel data and the local minimum pixel data of the $(i-1)^{th}$ data block;

determining whether the second difference is less than the threshold;

encoding one of the first difference, the second difference, the $N^{th}$ pixel data into an $N^{th}$ encoded pixel data according to the determining results; and outputting an indicating signal for indicating whether the $N^{th}$ encoded pixel data corresponds to the $(N-1)^{th}$ pixel data, the local minimum pixel data of the $(i-1)^{th}$ data block, the local maximum pixel data of the $(i-1)^{th}$ data block, or the $N^{th}$ pixel data.

12. The encoding method according to claim 11, wherein the step of encoding one of the first, the second difference and the $N^{th}$ pixel data, further comprises:

when the first difference is less than the threshold, encode the first difference into the $N^{th}$ encoded pixel data;

when the second difference is less than the threshold and when the first difference is not less than the threshold, encode the second difference into the $N^{th}$ encoded pixel data; and when the first and the second differences are not less than the threshold, encode the $N^{th}$ pixel data as the $N^{th}$ encoded pixel data.

13. The encoding method according to claim 11, wherein the 2×M pixel data are the pixel data of luminance (Y) or chrominance (U or V).

14. The encoding method according to claim 11, wherein the 2×M pixel data are the pixel data of red (R), green (G) or blue (B).

15. The encoding method according to claim 11, wherein in the step of encoding, encode the first and the second differences by a fixed bit coding method or a Huffman coding method.

16. A decoding method for receiving 2×M encoded pixel data and decoding an $N^{th}$ encoded pixel data of the last M encoded pixel data according to an indicating signal, the 2×M encoded pixel data being sequentially encoded from 2×M pixel data, a first to an $M^{th}$ pixel data of the 2×M pixel data being belonged to an $(i-1)^{th}$ data block, an $(M+1)^{th}$ to a $(2×M)^{th}$ pixel data of the 2×M pixel data being belonged to an $i^{th}$ data block, M, N and i being positive integers, i>1, M<N<2×M, the decoding method comprising:

determining whether the $N^{th}$ encoded current pixel data corresponds to the $(N-1)^{th}$ pixel data, the local minimum pixel data of the $(i-1)^{th}$ data block, the local maximum pixel data of the $(i-1)^{th}$ data block, or the $N^{th}$ pixel data according to the indicating signal;

decoding the $N^{th}$ encoded pixel data into one of a first decoded difference, a second decoded difference, and an $N^{th}$ decoded pixel data according to the determining result;

if the first decoded difference is outputted, adding the first decoded difference to the $(N-1)^{th}$ decoded pixel data to obtain the $N^{th}$ decoded pixel data; and if the second decoded difference is outputted, adding the second decoded difference to one of a local maximum decoded pixel data and a local minimum decoded pixel data of a $(i-1)^{th}$ decoded data block according to the indicating signal to obtain the $N^{th}$ decoded pixel data.

17. The decoding method according to claim 16, wherein the step of decoding the $N^{th}$ encoded pixel data, further comprises:

when the $N^{th}$ encoded pixel data corresponds to the $(N-1)^{th}$ pixel data, decode the $N^{th}$ encoded pixel data into the first decoded difference;

when the $N^{th}$ encoded pixel data corresponds to the local minimum pixel data of the $(i-1)^{th}$ data block or the local maximum pixel data of the $(i-1)^{th}$ data block, decode the $N^{th}$ encoded pixel data into the second decoded difference; and when the $N^{th}$ encoded pixel data corresponds to the $N^{th}$ pixel data, decode the $N^{th}$ encoded pixel data into the $N^{th}$ decoded pixel data.

18. The decoding method according to claim 16, wherein the 2×M pixel data are the pixel data of luminance (Y) or chrominance (U or V).

19. The decoding method according to claim 16, wherein the 2×M pixel data are the pixel data of red (R), green (G) or blue (B).

20. The decoding method according to claim 16, wherein in the step of decoding the Nth encoded pixel data, decode the Nth pixel data by a fixed bit coding method or a Huffman coding method.

* * * * *